UNITED STATES PATENT OFFICE.

OTTO SCHWEISSINGER, OF DRESDEN, ASSIGNOR OF ONE-HALF TO LOUIS HOFFMANN, OF HAMBURG, GERMANY.

PROCESS OF MAKING EXTRACT OF HOPS.

SPECIFICATION forming part of Letters Patent No. 496,752, dated May 2, 1893.

Application filed January 29, 1891. Serial No. 379,573. (No specimens.) Patented in Germany April 10, 1890, No. 54,812.

*To all whom it may concern:*

Be it known that I, OTTO SCHWEISSINGER, a subject of the King of Saxony, residing at the city of Dresden, in the Kingdom of Saxony, in the German Empire, have invented certain new and useful Improvements in the Manufacture of Extract of Hops, (for which I have obtained a patent in Germany, No. 54,812, dated April 10, 1890,) of which the following is a specification.

The subject of this invention is an extract of hops which unlike any of the products of a similar nature hitherto known retains all the component elements of hops which are considered valuable in the brewing industry. The process adopted for its manufacture enables it to be obtained in a thick semi-liquid state and to render it readily soluble in a cold temperature without the assistance of any special means.

The hop-extract obtained by this invention is intended for use as a substitute for fresh hops in the manufacture of beer and similar beverages. It is a well-known fact that the harvest of hops is not equally abundant every year. In some years particularly rich crops are obtained, both as regards quantity and quality; in others, the crops may be bad or insufficient. Now it is of the greatest importance for the brewing industry that good hops of a uniform standard quality should be at all times obtainable at reasonable prices, this being an essential condition both of the quality of the beer and of the remunerativeness of the beer manufacture itself. It has further been found that fresh hops will not keep in a good condition for more than one year at the outside, while preserved hops are at best of an inferior quality. The desideratum therefore was to find some means of preserving for a number of years, if possible, all the essential useful component parts of the hops, so as thereby to compensate for any lack of fresh hops in years of bad or insufficient harvest. This problem the process described herein, solves, as it enables hops with all their good and useful properties and component elements to be stored up and preserved for any number of years. To attain this object the hop dust (lupuline) is thoroughly freed from the husks by means of suitable sieves. Separate extracts are then made both from the pure lupuline and from the husks. For this purpose the husks are steeped in water and the resulting liquid is evaporated *in vacuo* so as to be reduced to a semi-liquid condition. As for the lupuline it is introduced into extractors specially erected for it and either quite cold or in a slightly heated condition treated with a mixture of ten parts of ether and ninety parts of alcohol until entirely extracted. The proportions of the ingredients of the said mixture may however vary according to circumstances and even the use of pure ether or of alcohol alone may be admissible. The lupuline extract may also wholly or partly be produced by compressing or by means of a centrifugal machine. The resulting solution is evaporated at the lowest temperature available and hence an extract is obtained which is solid in the cold and becomes liquid under the influence of heat and which is mixed in the liquid state with the husk-extract. The introduction of the mixture into the receptacles in which it is to be preserved is then immediately proceeded with and after spreading a layer of carbonic acid over the surface of the extract the receptacles are hermetically closed with a view to preventing the oxidation of the oil of hops and thereby enabling the extract to be kept in a good condition for a long time.

It has been proposed before this by Boulé to separate the hop-dust from the husks and to mix the extract obtained from the latter in a dry state with the hop-dust. The difference however between Boulé's process and that herein described is most essential both as regards the component materials and the action of the extract. In this invention the aqueous husk-extract is not dried and therefore undergoes no disintegration. Besides an extract of hop-dust instead of the natural article is here employed whereby the utilization of these substances only which may prove of use for brewing purposes are insured while such superfluous insoluble parts of the hops as cellulose and mineral substances are discarded; again the extract freed from all insoluble and worthless ingredients may be dissolved in a cold atmosphere without requiring any auxiliary apparatus such as pans, boilers, sieves or the like.

I claim—

The herein described process of manufacturing hop extract, consisting in first obtaining separate extracts from hop dust or flour (lupuline) and from the husks thereof by treating the husks with water and the dust or flour with ether, ether and alcohol, or other similar agents, then freeing the clear extracts from their inherent solvents by evaporation, and then mixing together the residual husk extract and the residual hop dust extract.

In testimony whereof I have hereunto set my hand in presence of two witnesses.

OTTO SCHWEISSINGER.

Witnesses:
   JNO. SCHMIDT,
   PAUL DRUCKEMÜLLER.